March 7, 1950 J. I. HELLER 2,499,995

PANORAMIC RECEIVER WITH DISCRIMINATOR-TYPE SWEEP CIRCUITS

Filed July 18, 1946 2 Sheets-Sheet 1

INVENTOR.
JOSEPH I. HELLER
BY Hyman Hurvitz

PANORAMIC RECEIVER WITH DISCRIMINATOR-TYPE SWEEP CIRCUITS

Filed July 18, 1946 2 Sheets-Sheet 2

*INVENTOR.*
JOSEPH I. HELLER
*BY* Hyman Hurvitz

Patented Mar. 7, 1950 2,499,995

UNITED STATES PATENT OFFICE 2,499,995

PANORAMIC RECEIVER WITH DISCRIMINATOR-TYPE SWEEP CIRCUITS

Joseph I. Heller, Brooklyn, N. Y., assignor to Panoramic Radio Corporation, New York, N. Y., a corporation of New York Application July 18, 1946, Serial No. 684,607

12 Claims. (Cl. 250—20)

This invention relates generally to oscillographic techniques, and in particular relates to devices for providing deflection voltages which are direct functions of the frequency produced by a variable frequency generating means, and which are not directly dependent on the devices which produce frequency variations in such generating means.

It has been the common practice in the prior art, where it was desired to set up a frequency representative sweep in a cathode-ray indicator or in oscillographs generally, to utilize wave forms which were direct functions of a frequency control means, rather than voltages which were a direct function of the frequency itself. For example, in sweep generators, frequency variation has been produced either by mechanical movement of a tuning element of an oscillator or by varation of control voltage applied to a reactance tube or other type of electronic frequency modulator associated with an oscillator, and in order to display on oscillographs frequency characteristics of devices coupled to the sweep generator, it has been usual to apply to deflection elements of the oscillograph voltages corresponding with the aforementioned variations in value of the tuning element or corresponding to the aforementioned modulator control voltage.

This procedure may be quite satisfactory so long as mechanical or electrical variations in the frequency varying means bear a direct and simple relation to the frequency variations produced thereby. Should such not be the case, however, readings of frequency on the face of the oscillograph become undependable.

The present invention envisages the utilization of the frequency variations themselves for generating frequency representative sweep voltages for cathode-ray indicators and the like, the said variations being detected in suitable frequency discriminators, the outputs of the latter being representative of the frequency variations.

One type of device which utilizes frequency sweeping techniques, and in which it is desired to provide a visual presentation of frequency related responses, is the panoramic or frequency scanning receiver, which may take various specific forms. In particular, reference is had to U. S. Patent #2,391,940, issued in the name of Wallace et al., on January 23, 1945; to application for U. S. patent, Serial #663,312, filed in the name of Marcel Wallace, dated April 19, 1946, and entitled Panoramic devices; to U. S. Patent #2,367,907, issued to Marcel Wallace, on January 23, 1945; and to U. S. Patent #2,378,604, issued to Marcel Wallace, on June 19, 1945, which disclose representative types of panoramic systems of reception and indication to which my present invention may be applied, no intention of excluding other such systems being intended by the above reference to selected representative ones of such systems.

A further type of device which utilizes frequency sweeping techniques and to which my invention finds application, is the frequency modulated signal generator, utilizable for producing on the face of a cathode-ray indicator visual presentations of the frequency responses of electrical circuit elements or devices. In such devices it is usual to provide a frequency modulated or frequency scanning signal of constant amplitude, applying same to a circuit element or device to be tested and applying a signal which has been modified in amplitude by the frequency transfer characteristics of the circuit element or device being tested to one deflection element of a cathode-ray indicator or equivalent device. It has further been the usual practice in such testing devices to provide a frequency representative scanning voltage for another of the deflection elements of the cathode-ray indicator, or its equivalent, and which is representative of the magnitude of the frequency modulating signal rather than of the instantaneous frequency itself. Accordingly, should a simple direct relation fail to exist between the modulating signal and the resultant modulation or frequency deviation, the visual frequency response characteristic produced will be distorted.

By resort to the principles of the present invention, the undesirable consequences of such failure are obviated, since I utilize the frequency modulated or frequency scanning signal of constant amplitude itself to generate the sweep voltage, applying same to a linear frequency discriminator, of known character, the output voltage of which, being proportional to the input frequency, may be utilized as a sweep voltage for the cathode ray indicator.

It is sometimes desirable to scan an extremely wide band of frequencies periodically, and to present visual indications of the magnitude and position in the frequency band of each signal available in the band. In order to provide for scanning of a frequency band of sufficient extent, as, for example, in searching for the existence and location of frequencies suspected to exist within an extensive frequency spectrum, mechanical frequency scanning devices must be resorted to, no purely electronic method of modulation being presently available which is capable of producing a frequency deviation of the extent required. Resort may be had in systems of this character, to the principles of the present invention, for producing an oscilloscope sweep voltage which is synchronized with the frequency deviations of the main or primary scanning device.

In this connection the problem of discriminating frequencies over as wide a spectrum as is scanned by the primary scanning device may be avoided by providing an auxiliary or secondary oscillator or signal source the frequency of which is modulated synchronously with that of the main device, but with a smaller deviation, and utilizing the signal output of the secondary device for sweep voltage generation. By means of this expedient a suitable sweep voltage may be generated without requiring a discriminator capable of detecting frequencies extending over the entire band of the main or primary scanning device. The same result may also be effected by translating the frequencies of the main or primary scanning device to an extremely high value by means of a conversion process, since frequency discriminators capable of detecting signals over a wide band of frequencies may be constructed more readily at the high frequencies, where the total frequency band to be detected is a relatively small percentage of the absolute frequency value of any frequency of the band.

Upon frequency scanning of a translation device such as a tuned radio frequency receiver by mechanical devices, such as variable condensers, no signal is normally generated which might be utilized, after detection in a frequency discriminator, as sweep voltage. It has been the usual practice in systems of this type, to provide a sweep signal generator in the form of a potentiometer, driven mechanically in synchronism with the mechanical tuning or scanning device. Potentiometers of the type suitable for providing sweep voltages have proven unsatisfactory in practical use by reason of the fact that such potentiometers, as usually constructed, require frictional contact between one or more brushes and certain resistance elements. After some usage of potentiometers of the above character, noise and inaccuracies of output inevitably develop, especially where the sweep voltage is required to be at a relatively high recurrence rate.

In accordance with the present invention I propose to develop sweep voltages, for systems of the character described in the previous paragraph, by providing an auxiliary oscillator and a frequency discriminator therefor, the mean frequency of the oscillator as well as the extent of its frequency excursions bearing any desired or convenient relation to the mean frequency and the scanning excursions of the primary scanning apparatus. Since the tuning of the auxiliary oscillator may be accomplished by means of a rotating condenser, limitations in respect to recurrence rate do not exist and limitations in respect to extent of frequency excursion are substantially obviated, by proper choice of the region in which operation takes place, and by proper choice of operating parameters of the system.

It is, accordingly, an object of the invention to provide a panoramic or frequency scanning system of signal reception and indication, wherein the indicator is controlled in response to values of instantaneous frequencies utilized in the system.

It is another object of the invention to provide a panoramic or frequency scanning receiver-indicator system for displaying signal responses on one axis of a cathode-ray indicator against frequency of the response producing signals on another axis, and wherein the required frequency representative deflections of the cathode-ray of the indicator correspond directly with the frequencies at which the responses take place.

It is still another object of the invention to provide an improved system for testing transfer characteristics of electrical circuit elements and devices over a range of frequencies, and for providing visual indications of such characteristics.

It is an object of the present invention, in general, to provide frequency representative sweep voltages for oscillographs which are directly representative of frequency, by detection in a frequency discriminator of frequency variations produced in systems of the character above described.

It is a further object of the present invention to provide frequency representative deflections of the beam of a cathode-ray indicator which bear a direct and simple relation to, and which are produced directly in response to, the frequencies intended to be represented.

It is another object of the invention to generate sweep voltages for a cathode-ray indicator by frequency discrimination of frequency deviated signals provided by a signal source auxiliary to a primary scanning device, such as a scanning radio receiver, and in which the mean frequency of the auxiliary source and/or the frequency deviations thereof may be unrelated in magnitude to the corresponding operating characteristics of the primary scanning device, being selected solely for reasons of convenience of design of the said auxiliary source and of its associated discriminator circuit.

The above and still further objects and advantages of the invention will become apparent upon study of the following detailed description of various embodiments thereof, when taken in conjunction with the accompanying drawings, wherein.

Figure 1:
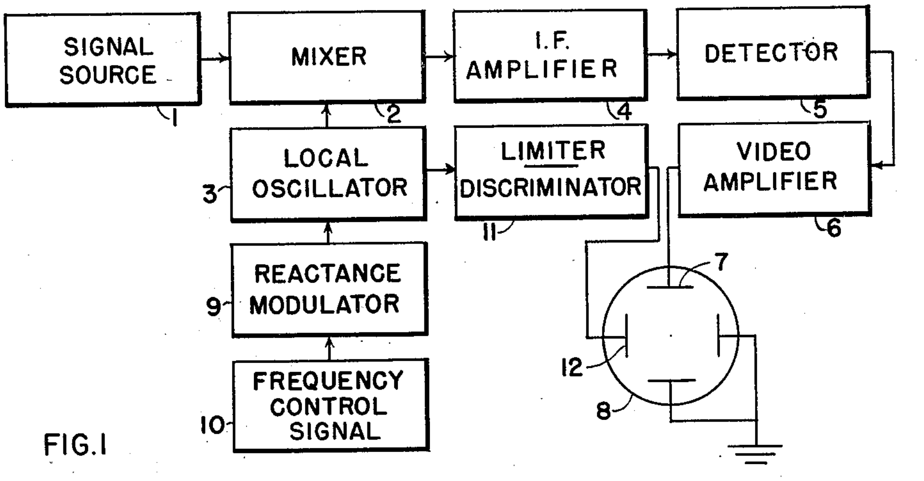
Figure 1 is a block diagram of a frequency scanning device which utilizes the principles of the present invention.

Referring now specifically to the drawings, and particularly to Figure 1 thereof, the numeral 1 denotes a source of signals, and which may comprise an antenna and a pre-selector circuit, or which may comprise a frequency conversion stage and an intermediate frequency amplifier for translating one or a plurality of communication or radar channels.

Signals derived from a signal source 1 are applied to a mixer 2, to which is also applied signals derivable from a scanning oscillator 3, the frequencies of the latter signals being selected to provide conversion frequencies at the output of the mixer 2 which fall successively within the pass band of the relatively narrow band I. F.

amplifier 4. Amplified signals derived from the amplifier 4 are detected in an amplitude detector 5, the detected output being amplified in video amplifier 6 to a magnitude suitable for application to the vertical plate 7 of the cathode-ray indicator 8.

In order to provide a visual presentation of the relative amplitude and frequency separations of all signals available at the signal source 1 the frequency of the oscillator 3 is varied or swept periodically over a series of values suitable for causing each of the frequencies in a predetermined portion of the spectrum of frequencies available at signal source 1 to convert in succession to a value translatable by the I. F. amplifier 4. The sweeping of oscillator 3 may be accomplished in various manners, well known per se. In the embodiment of the invention which is illustrated in Figure 1 of the drawings, a reactance modulator 9 is associated with the oscillator 3, and varies the tuning thereof perodically in response to a periodic frequency control voltage provided by the generator or signal source 10. The voltage of generator or signal source 10 may be of saw-tooth character, or sinusoidal, or of any other desired character, the production of horizontal sweep voltage for indicator 8 being completely unaffected by the law of frequency variation of the oscillator 3, as will appear below.

It will be obvious to those skilled in the art that the frequency of oscillator 9 might be modified by mechanical variation of the reactance of a condenser or inductance associated with the frequency determining circuit of the oscillator 9, if desired. In any event, and regardless of the manner of production or the character of the variations in frequency undergone by oscillator 3, signals derived therefrom are applied to a discriminator 11 tuned to the center or unmodulated frequency of the oscillator 3, and capable of responding linearly to variations of that frequency over the total excursion thereof.

The output of the discriminator 11 may be applied, after suitable amplification, if necessary, to horizontal plates 12 of indicator 8.

It will be clear that with the above arrangement any failure of direct proportionality between the frequency modulating effect applied to oscillator 3 and the actual frequency variations produced therein has no effect on the dependability of calibration of indicator 8, nor on the accuracy of measurement and information derived from visible presentations on the face thereof.

Figure 2:
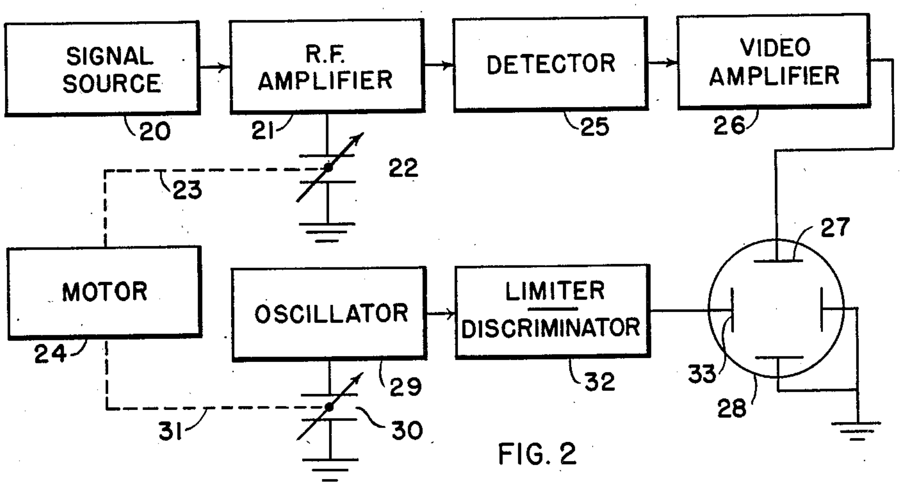
Figure 2 is a block diagram of a modification of Figure 1.

Referring now to Figure 2 of the drawings, the numeral 20 refers to a signal source, the signal source providing a band of frequencies of predetermined extent. In one possible application of the device of Figure 2 the source 20 may represent a signal receiving antenna. Signals received by the source 20 may be applied to a relatively narrow band amplifier 21, the acceptance band of which is small relative to the band of frequencies provided by the source 20, but which is periodically tuned in such fashion as to scan all the frequencies of the said band of frequencies in sequence, by variation of the capacitance of condenser 22, the latter being rotated or otherwise driven over the mechanical linkage 23 from the motor 24. The output signals derived from amplifier 21 are detected in amplitude detector 25, the output of which may, after suitable amplification in video amplifier 26, be applied to the vertical plates 27 of a cathode-ray indicator 28.

In order to provide a horizontal sweep of the cathode-ray of indicator 28 which is synchronized with the excursions of tuning of the R. F. amplifier 21, I provide an oscillator 29, tuned by a condenser 30, which is a duplicate of condenser 22 and which is driven in synchronism therewith over linkage 31. The output of oscillator 29 may be applied to a discriminator 32 for development of a D. C. voltage having a sense and a magnitude with respect to zero magnitude which is proportional to the excursions of frequency of the oscillator 29 with respect to the median frequency of the band of frequencies over which modulations take place. The output of frequency discriminator 32 may be utilized as a horizontal sweep voltage for the plates 33 of indicator 28.

It will be clear that so long as the response of discriminator 32 is linear, and so long as R. F. amplifier 21 and oscillator 29 are modulated in synchronism by their respective tuning condensers 22 and 30, that the horizontal position of the cathode-ray of indicator 28 will be truly representative of the frequency of incoming signals.

While I have described the embodiment of the invention which is illustrated in Figure 2, as operating with oscillator 29 and amplifier 21 always tuned to the same frequency, such operation is by no means necessary, and is in fact undesirable under some circumstances.

In some applications of the system of Figure 2 the R. F. amplifier 21 may be caused to scan an extremely wide band of frequencies, one specific application of the system of Figure 2 involving its use as a search receiver, for determining the presence and position of signals in a predetermined frequency spectrum of great extent. In such case the total spectrum scanned by the amplifier 21 may be too great in extent for effective linear frequencies detection in presently available frequency detectors. The oscillator 29 may be designed then to operate at the same mean frequency as the amplifier 21, and to deviate in frequency to a lesser extent than does the R. F. amplifier 21, but in isochronism therewith. Alternatively or additionally the oscillator 29 may be displaced in respect to its mean frequency from that of the amplifier 21, but may be caused to deviate in respect to frequency in isochronism with the deviations of tuning of the amplifier 21, reaching each limit of its tuning precisely at the same time as does the amplifier 21.

Figure 3:
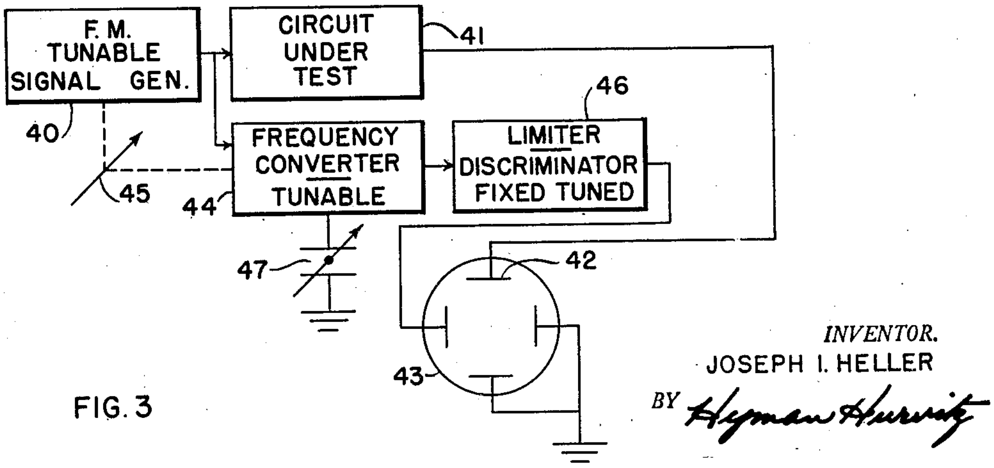
Figure 3 is a block diagram of a device for utilizing the principles of the invention in conjunction with a signal generator for providing accurate frequency response characteristics.

Referring now to Figure 3 of the drawings, I disclose a system for obtaining the frequency response curve of electrical circuit elements or devices, certain deviations of the cathode-ray of a cathode-ray oscilloscope provided for viewing the response curve being truly representative of frequency deviations of a frequency modulated signal generator.

The signal generator 40 may be of any type known to the art or commercially available, and is preferably adjustable as to sweep width and tunable over a considerable band of frequencies. In order to determine the response of the circuit under test, denoted by block 41, signal from the generator 40 is applied via circuit 41 to the vertical plates 42 of a cathode-ray oscilloscope 43, suitable amplifiers being interposed as required.

The output of the generator 40 is likewise applied to a frequency converter 44, including the usual local oscillator, which is tunable over a range of frequencies of equal extent with but displaced by a constant difference from that of generator 40, it being desired in the present application to provide a constant output frequency from the converter 44, regardless of the frequency to which generator 40 may be tuned. The tuning element of generator 40 and of converter 44 may be ganged, if desired, and actuated jointly by manual control 45, the constant difference output frequency from converter 44 being applied to a linear discriminator 46 tuned to the central frequency of the output band of frequencies provided by converter 44 as the frequency of generator 40 is modulated.

Condenser 47 is utilized as a trimmer for varying slightly the frequency of the local oscillator associated with converter 44. It will be clear that variations of this frequency will cause a shift of the entire frequency response pattern presented on the face of indicator 43, enabling centering of the pattern and compensation for failure of tracking which may occur between generator 40 and converter 44. It will be further clear, since the frequency of the output of converter 44 sweeps only in response to the modulations of frequency of generator 40, that the output of converter 44 is a precise replica in respect to frequency of the output of generator 40, allowance being made for the constant difference of frequency introduced by the conversion step.

Since the discriminator 46 includes a limiter the D. C. output thereof is a function of the frequency deviations of generator 40 only, and calibrations of the face of the indicator 43 are dependable, accordingly.

Figure 4:
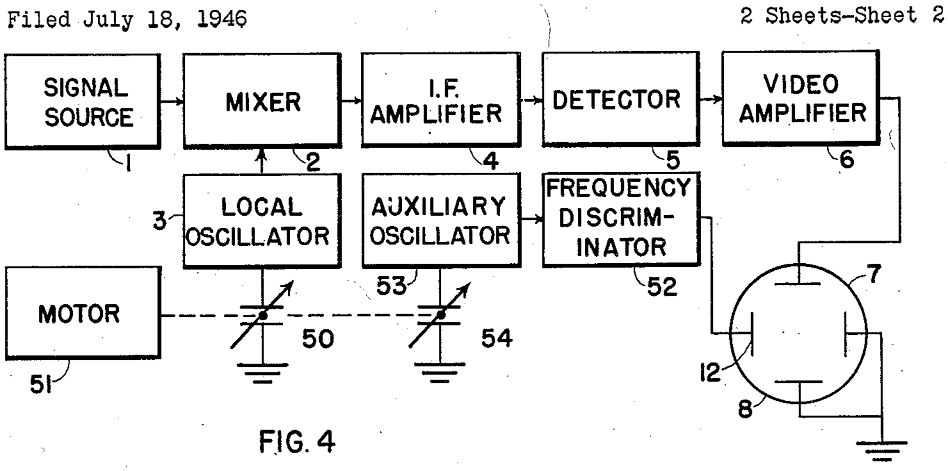
Figure 4 is a block diagram of a device of the nature of that illustrated in Figure 1, but which utilizes an auxiliary oscillator for developing sweep signals.

Referring now specifically to Figure 4 of the drawings, wherein certain elements are identical with corresponding elements of Figure 1, and to which I have accordingly applied the same numerals of reference, I provide a signal source 1, a mixer 2, an I. F. amplifier 3, a detector 5, a video amplifier 6, and an oscilloscope 8, all having precisely the same functions as has been previously explained in connection with the detailed description of the system of Figure 1.

The local oscillator 3, in the embodiment of the invention which is illustrated in Figure 4 of the drawings, is caused to be frequency modulated by means of a variable condenser 50, which is continuously driven by a motor 51. The local oscillator 3 is tuned over an extensive frequency band, in the embodiment of Figure 4, and of such extent in relation to the mean frequency thereof, as to render extremely difficult detection of such frequencies in a frequency discriminator, in accordance with the teaching of Figure 1. In order to provide a suitable source of frequency modulated signals for application to discriminator 52 I provide an auxiliary oscillator 53, which may be frequency modulated by causing variation of the capacitance of variable tuning condenser 54, associated with oscillator 53 in tuning relation. The condenser 54 may be driven by the motor 51 in the same manner as is condenser 50, and may in fact be mounted on the same shaft as the latter. However, the mean frequency of the auxiliary oscillator 53 and/or its frequency excursions may be entirely different than the mean frequency and/or the frequency excursions of the oscillator 3, and being chosen with a view to most efficient and desirable operation in conjunction with the discriminator 52.

In general, the auxiliary frequency provided by the oscillator 53 may be modulated in frequency to but a small extent, should the mean frequency thereof be relatively low. However, should the mean frequency be sufficiently high a relatively wide frequency deviation in terms of absolute value may well represent a sufficiently small percentage deviation of frequency to enable design of a suitable discriminator 52, capable of effective detection over the entire band of frequencies required.

Bearing this fact in mind, a further embodiment of the invention of Figure 4 may be devised, and in which the auxiliary oscillator 53 is dispensed with, there being substituted therefor a mixer 55, into which is injected signals generated by the local oscillator 3, as well as signals provided by an auxiliary heterodyne oscillator 56, which serves to convert the frequencies of the oscillator 3 upwards in frequency, and to series of values the lowermost of which is greater than the greatest frequency within the capabilities of the local oscillator 3. The output of the mixer 55, may be selected to be at a sufficiently high median value to enable discrimination in the discriminator 52 of the entire spectrum of frequencies applied thereto. The total width of the spectrum derivable from the mixer 55 is precisely equal to that derivable from the local oscillator 3, and the output of the mixer 55 is a replica of the output of the oscillator 3, but with a constant arithmetical difference in the instantaneous frequencies of the two sources.

Figure 5:
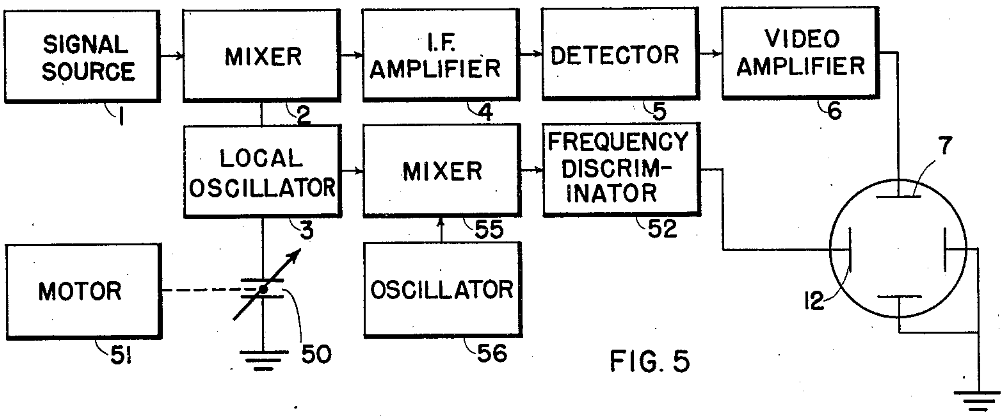
Figure 5 is a block diagram of a modification of Figure 4.
Figure 6:
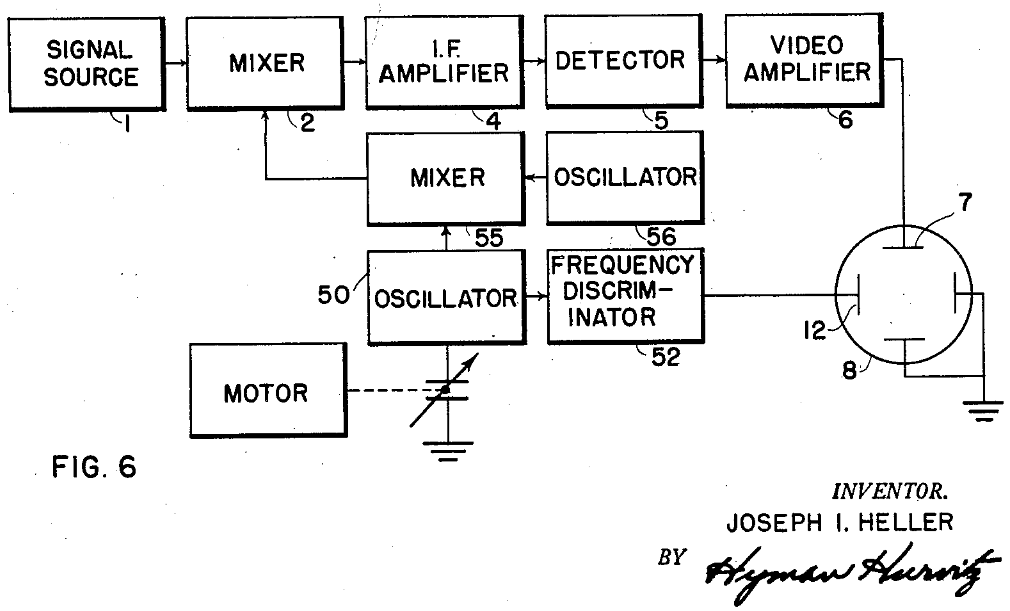
Figure 6 is a block diagram of a further modification of Figure 1.

The arrangement of Figure 6 is a modification of Figure 5, wherein the output of the variable oscillator, which has a relatively high median frequency is applied directly to the frequency discriminator 52 for developing sweep voltages for the oscillator 8. A frequency modulated signal for application as a local oscillation to the mixer 2 is derived from mixer 55 by conversion downward in frequency of the output of oscillator 50 by heterodyning said output in auxiliary mixer 55 with signals derived from an auxiliary oscillator 56. By means of the system of Figure 6 a relatively small percentage deviation of frequency at the oscillator 50 may be caused to produce an extremely large percentage deviation of frequency input to the mixer 2. For example, assume the oscillator 50 to be modulated in frequency over the spectrum 850–950 mc., providing a mean frequency at 900 mc. and a deviation of slightly more than 10%. If then the oscillator 56 is designed to provide an output frequency of 750 mc., and the output of the mixer 55 tuned to pass the lower sideband of the conversion products, the output of the mixer 55 will vary from 100 to 200 mc., a deviation of 100%. This may be a feature of great advantage in frequency scanning receivers intended for extremely wide band application.

While I have described various specific embodiments of my invention, it will be obvious that various modifications of the arrangements disclosed may be resorted to without departing from the spirit and scope of the invention, which is defined in the appended claims.

What I claim and desire to secure by Letters Patent of the United States is:

1. A panoramic device for analyzing signals relatively displaced in a predetermined frequency spectrum, comprising, a superheterodyne receiver comprising a frequency modulated heterodyning signal source having a predetermined total frequency deviation for scanning said spectrum to enable receiving of said first mentioned signals successively, means responsive to said receiver for indicating the relative locations of said signals in the said spectrum against a base line, means for providing frequency modulated sweep signals having a total deviation smaller than said predetermined frequency deviation and a percentage deviation smaller than the percentage deviation of said frequency modulated heterodyning signal source, frequency discriminator means for detecting said sweep signals, and means responsive to the output of said discriminator means for providing base line generating sweep voltage for said means for indicating.

2. The combination in accordance with claim 1, wherein said means for providing frequency modulated sweep signals comprises an auxiliary oscillator, frequency modulated in isochronism with said frequency modulated signal source.

3. A device for analyzing signals occupying relatively displaced positions in a predetermined first frequency spectrum, comprising, a superheterodyne receiver for said signals comprising a source of local oscillations, means for periodically varying the frequency of said local oscillations over a second predetermined spectrum, a cathode ray tube indicator having first and second ray deflecting elements, means for applying to one of said ray deflecting elements output signals derived from said receiver, means for applying to the other of said ray deflecting elements a voltage adapted to generate a frequency calibratable base line, means for deriving said last named voltage comprising means for generating a variable frequency occupying a frequency spectrum non-coincident with said second frequency spectrum and having a lower percentage deviation, and a frequency discriminator network for detecting said last named variable frequency to derive therefrom a voltage which is a function of said frequency.

4. The combination in accordance with claim 3 wherein said means for generating said variable frequency comprises means for frequency converting said local oscillations to a higher frequency.

5. The combination in accordance with claim 3 wherein said means for generating said variable frequency comprises an auxiliary oscillator, frequency modulated in isochronism with said local oscillations.

6. The combination in accordance with claim 3 wherein said source of local oscillations comprises a mixer and wherein said means for generating said variable frequency comprises an oscillator, said oscillator providing input signal to said mixer for conversion thereby.

7. A panoramic analyzer for signals relatively displaced in a predetermined frequency spectrum, comprising, a superheterodyne receiver comprising a frequency modulated local oscillator having a first percentage frequency deviation for scanning said spectrum to enable receiving of said signals successively, oscilloscopic means responsive to said receiver for indicating the relative locations of said signals in the said frequency spectrum, means for providing further frequency modulated signals having a second and a smaller percentage frequency deviation, said further frequency modulated signals non-coincident in frequencies with the frequencies of said frequency modulated local oscillator, means comprising a frequency disciminator for frequency detecting said further frequency modulated signals to provide a variable voltage, and means responsive to said variable voltage for generating a frequency representative base line for said oscilloscopic means.

8. A panoramic system of signal reception for signals extending over a relatively wide spectrum, comprising, a mixer, a frequency converting oscillator, means for applying signals from said source of signals and from said oscillator to said mixer for mixing thereby, relatively narrow band filter means for receiving signals derived from the output of said mixer, means for indicating the amplitudes of signals derived from said relatively narrow band filter means against a frequency representative base line, means for frequency modulating said oscillator, means comprising a frequency converter responsive to output frequencies of said oscillator for increasing said output frequencies of said oscillator, and a frequency discriminator responsive to said frequency converter for providing said frequency representative base line.

9. A panoramic system of signal reception of signals extending over a relatively wide frequency spectrum, comprising, a band pass circuit having a relatively narrow instantaneous pass band, means for varying the pass band of said band pass circuit over at least a portion of said spectrum, means for generating oscillations, means for modulating the frequency of said oscillations over a spectrum narrower and of substantially smaller percentage deviation than said at least a portion of said spectrum in synchronism with said varying, an indicator for indicating the frequency content of said spectrum against a frequency representative base line, and frequency discriminator network means responsive to said oscillations for controlling said indicator to establish said frequency representative base line thereon.

10. A panoramic system of signal reception for signals extending over a relatively wire frequency spectrum, comprising, a band pass circuit means having a relatively narrow instantaneous pass band, means for scanning the pass band of said band pass circuit means over at least a portion of said spectrum having a first deviation and a first percentage deviation from a mean frequency, means for generating oscillations having a second and different deviation and a second and subsantially lower percentage deviation from a means frequency, means for modulating the frequency of said oscillations isochronously with said scanning, an indicator, and means responsive to said oscillations for controlling said indicator to establish a time base thereon.

11. A panoramic system of signal reception of signals extending over a relatively wide frequency spectrum, comprising, a band pass circuit having a relatively narrow instantaneous pass band, means for varying the frequency position of said pass band in said spectrum over at least a portion of said spectrum, said last means comprising a first variable capacitor, means for generating oscillations, means for modulating the frequency of said oscillations over a frequency spectrum, said last means comprising a second variable capacitor, an indicator for indicating the frequency content of said spectrum against a frequency representative base line, frequency discriminator network means responsive to said oscillations for controlling said indicator to establish said frequency representative base line thereon, and means for synchronously actuating said first and second variable capacitors.

12. A panoramic device for analyzing signals relatively displaced in a predetermined frequency spectrum, comprising, a superheterodyne receiver comprising a frequency modulated heterodyning signal source having a predetermined total frequency deviation for scanning said spectrum to enable receiving of said first mentioned signals successively, said frequency modulated heterodyning signal source comprising a tuning capacitor, means responsive to said receiver for indicating the relative locations of said signals in the said spectrum against a base line, means for providing frequency modulated sweep signals comprising an oscillator having a tuning capacitor, frequency discriminator means for detecting said sweep signals, means responsive to the output of said discriminator means for providing base line generating sweep voltage for said means for indicating, and means for synchronously actuating said tuning capacitors.

JOSEPH I. HELLER.

REFERENCES CITED

The following references are of record in the file of this patent:

UNITED STATES PATENTS

| Number | Name | Date |
|---|---|---|
| 2,131,558 | Granger | Sept. 27, 1938 |
| 2,215,197 | Sherman | Sept. 17, 1940 |
| 2,247,544 | Daily | July 1, 1941 |
| 2,367,907 | Wallace | Jan. 23, 1945 |
| 2,405,765 | Smith | Aug. 13, 1946 |

FOREIGN PATENTS

| Number | Country | Date |
|---|---|---|
| 113,637 | Australia | Aug. 8, 1940 |